United States Patent
Beller et al.

(10) Patent No.: US 11,738,772 B1
(45) Date of Patent: Aug. 29, 2023

(54) OBJECT AVOIDANCE WITH PERCEIVED SAFETY SUBGOAL

(71) Applicant: Zoox, Inc., Foster City, CA (US)

(72) Inventors: Andrew E. Beller, San Francisco, CA (US); Ari Joseph Goldberg, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 306 days.

(21) Appl. No.: 17/127,450

(22) Filed: Dec. 18, 2020

(51) Int. Cl.
　　*B60W 30/095* (2012.01)
　　*B60W 60/00* (2020.01)
　　*B60W 30/09* (2012.01)
　　*B60W 10/04* (2006.01)
　　*B60W 10/18* (2012.01)
　　*B60W 10/20* (2006.01)

(52) U.S. Cl.
　　CPC ........ *B60W 60/0011* (2020.02); *B60W 30/09* (2013.01); *B60W 30/0956* (2013.01); *B60W 60/0027* (2020.02); *B60W 10/04* (2013.01); *B60W 10/18* (2013.01); *B60W 10/20* (2013.01); *B60W 2520/10* (2013.01); *B60W 2554/4029* (2020.02); *B60W 2554/801* (2020.02)

(58) Field of Classification Search
　　CPC ............ B60W 60/0011; B60W 30/09; B60W 30/0956; B60W 60/0027; B60W 2520/10; B60W 2554/4029; B60W 2554/801
　　See application file for complete search history.

(56) References Cited

U.S. PATENT DOCUMENTS

| | | | |
|---|---|---|---|
| 10,353,390 B2* | 7/2019 | Linscott | G06N 3/08 |
| 2011/0246156 A1* | 10/2011 | Zecha | G06V 40/23 |
| | | | 703/6 |
| 2017/0210379 A1* | 7/2017 | Obata | B60W 30/18163 |
| 2018/0233048 A1* | 8/2018 | Andersson | G08G 1/166 |
| 2019/0238436 A1* | 8/2019 | Volos | H04L 43/0852 |
| 2019/0317511 A1* | 10/2019 | Xu | B60W 30/09 |
| 2019/0317519 A1* | 10/2019 | Chen | G06V 10/82 |
| 2021/0046954 A1* | 2/2021 | Haynes | B60W 60/0011 |
| 2021/0094577 A1* | 4/2021 | Shalev-Shwartz | |
| | | | B60W 30/0953 |
| 2021/0114589 A1* | 4/2021 | Komuro | B60W 10/04 |
| 2021/0114621 A1* | 4/2021 | Komuro | B60W 30/0953 |
| 2021/0300412 A1* | 9/2021 | Dingli | B60W 50/0098 |
| 2021/0300427 A1* | 9/2021 | Tao | B60W 60/0027 |
| 2021/0339741 A1* | 11/2021 | Rezvan Behbahani | |
| | | | B60W 40/04 |
| 2021/0387651 A1* | 12/2021 | Kuroda | B60W 60/0027 |

(Continued)

*Primary Examiner* — Ryan Rink
(74) *Attorney, Agent, or Firm* — Lee & Hayes, P.C.

(57) ABSTRACT

Techniques for determining a speed for a vehicle as it traverses an environment with pedestrians are discussed herein. For example, a vehicle computing system may implement techniques to determine an action for a vehicle to take based on a detected pedestrian in an environment. The vehicle computing system may receive sensor data of an environment from a sensor associated with a vehicle, determine, based at least in part on the sensor data, an object in the environment and receive a predicted object trajectory associated with the object. The vehicle computing system may then determine, based on the predicted object trajectory, a distance between a simulated vehicle passing location and a predicted object location, determine, based on the distance, a speed, determine, based on the distance and the speed, a trajectory for the vehicle to follow, and control the vehicle based on the trajectory.

20 Claims, 5 Drawing Sheets

(56) References Cited

U.S. PATENT DOCUMENTS

| | | | |
|---|---|---|---|
| 2022/0227367 A1* | 7/2022 | Kario | B60W 30/0956 |
| 2022/0340169 A1* | 10/2022 | Floor | B60W 30/0956 |
| 2022/0355820 A1* | 11/2022 | Bruno | B60W 60/0011 |

* cited by examiner

OBJECT AVOIDANCE WITH PERCEIVED SAFETY SUBGOAL

BACKGROUND

Planning systems in autonomous and semi-autonomous vehicles determine actions for a vehicle to take in an operating environment. Actions for a vehicle may be determined based in part on avoiding objects present in the environment. For example, an action may be generated to stop for a pedestrian that is within a threshold distance of a path of the vehicle, slow behind a bicyclist operating in the path, or the like. Traditional planning systems may choose an action for the vehicle based on a determination that the action is a most conservative action, such as remaining stopped until the pedestrian has moved completely out of the path, remaining behind the bicycle, or the like. However, such traditional planning systems may actually prevent the vehicle from operating safely in the environment (as such operations may cause secondary collisions). As such, the traditional planning systems may negatively impact vehicle progress without necessarily improving operational safety.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
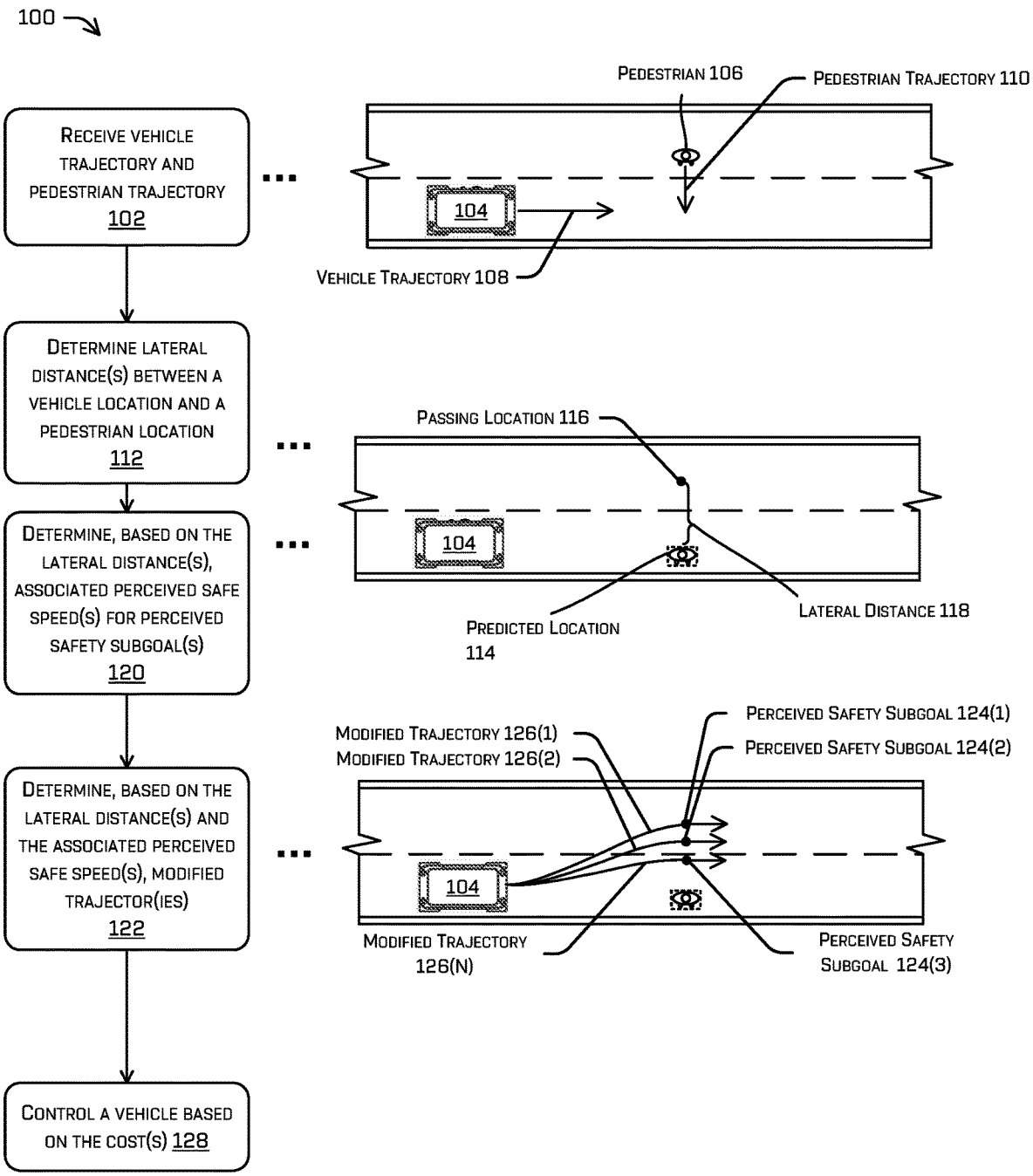
FIG. 1 is an illustration of a process for determining a modified trajectory to navigate a vehicle around an object using perceived safety subgoal constraints.

This disclosure is directed to techniques for dynamically determining an action for a vehicle to take (e.g., a path to travel) relative to an object. In some examples, a vehicle computing system may detect the object at a location and determine that the location is relevant to the path of the vehicle. The vehicle computing system may determine whether to modify the trajectory of the vehicle to navigate around the object based on the determination that the object is relevant to the path. Where the vehicle computing system determines to modify the trajectory of the vehicle to navigate around the object, the vehicle computing system may utilize a perceived safety subgoal to determine a lateral distance and perceived safe speed for passing the object.

A perceived safety subgoal may be a constraint and/or cost separate from and/or in addition to safety constraints and/or costs. Where safety constraints and/or costs may be directed to ensuring safety, such as avoiding collisions and/or injuries, a perceived safety subgoal may be constraints and/or costs directed to increasing the perception or feeling of safety of passengers, pedestrians and/or other persons. In some examples, trajectories complying with and/or determined based on perceived safety subgoals may be perceived as more natural and comfortable (e.g., closer to what a human driver may be expected to do).

In some examples, the perceived safety subgoal may include constraints on the lateral distance and vehicle speed at a passing location. As used herein, a passing location may refer to a location in the path of the vehicle at which the object being passed is in a direction relative the vehicle that is perpendicular to the direction of travel of the vehicle (e.g., beside the vehicle). However, examples may vary in the specific determination of the passing location (e.g., whether the point of reference from the vehicle is the front of the vehicle or a center of the vehicle). More particularly, a perceived safety subgoal may constrain trajectories of the vehicle that may be selected to perceived safe speeds relative to the lateral distance (e.g., trajectories that do not meet the constraints on the lateral distance associated perceived safe vehicle speeds at the passing location may be excluded). A perceived safe speed may be determined based on the planned lateral distance to the object when passing the object. In some examples, as planned lateral distances increase, perceived safe speeds may increase. Similarly, as planned lateral distances decrease, perceived safe speeds may decrease.

In addition or alternatively, some examples may utilize the perceived safe vehicle speeds associated with the lateral distances to determine cost(s). In such examples, the lateral distance and associated perceived safe vehicle speeds may not be utilized as hard constraints.

In some examples, the perceived safety subgoal may include a weighted perceived safe speed cost considered in determining a vehicle speed of the vehicle when passing an object. The weighted perceived safe speed cost may be based on the perceived safe speed determined based on a planned lateral distance. The weighted perceived safe speed cost may be determined based on an excess (or difference) of the planned vehicle speed over a perceived safe speed associated with the planned lateral distance. Additional discussion of determining costs is provided below.

In some examples, a weight of the weighted perceived safe speed cost may be influenced by the planned lateral distance and/or the distance remaining to the object. For example, a weight of the weighted perceived safe speed cost may increase (e.g., linearly, logarithmically, exponentially, etc.) as the planned lateral distance decreases. In such an example, as the planned lateral distance decreases, the tolerance for deviation from the perceived safe speed associated with the planned lateral distance may also decrease. Similarly, a weight of the weighted perceived safe speed cost may increase (e.g., linearly, logarithmically, exponentially, etc.) as the distance remaining to the object decreases. In some examples, the weight may be determined based on the distance remaining to the object such that the vehicle begins reacting to the presence of the object at a distance that may be perceived as natural and comfortable (e.g., closer to what a human driver may be expected to do). For example, the weight may be minimal prior to a distance of four (4) car lengths, with the weight increasing as the distance remaining decreases thereafter.

Further, the perceived safe speeds associated with lateral distances may also differ for different classifications of objects. For example, for a given lateral distance, the perceived safe speed for passing a bicyclist may be greater than the perceived safe speed for passing a pedestrian.

While some examples discussed herein utilize the lateral distance in determining a perceived safe speed and other factors may be utilized. In some examples, a perceived safe lateral distance and/or associated perceived safe speed for passing a pedestrian may be determined based at least in part on a height of the pedestrian, the arm length of the pedestrian and/or other similar data. For example, a perception component of the vehicle may detect a pedestrian and, based on sensor data, determine the height or arm length of the pedestrian. The vehicle computing system may use the determined height and length in determining, for example, a minimum perceived safe lateral distance and associated perceived safe speed, possibly in combination with other factors.

In some examples, when a path or trajectory for a lateral distance cannot be planned which meets a perceived safe speed cost threshold or cannot otherwise match perceived safety constraints, the vehicle computing system may cause paths with other lateral distances to be considered. For example, the vehicle computing system may consider a path or trajectory with a greater lateral distance, potentially after ensuring space remains in the operating lane or ensuring space is available in an adjacent lane or shoulder of the road for the greater lateral distance.

The vehicle may include an autonomous or semi-autonomous vehicle with a vehicle computing system configured to detect one or more objects in the environment. The objects may include static objects (e.g., buildings, bridges, signs, etc.) and dynamic objects such as other vehicles (e.g., cars, trucks, motorcycles, mopeds, etc.), pedestrians, bicyclists, or the like. Unless indicated to the contrary, the term "object" herein refers to a dynamic object (e.g., an object which is moving and/or capable of movement, albeit stopped for an instant). In some examples, the objects may be detected based on sensor data from sensors (e.g., cameras, motion detectors, lidar, radar, time of flight, etc. or any combination thereof) of the vehicle. In some examples, the objects may be detected based on sensor data received from remote sensors, such as, for example, sensors associated with another vehicle or sensors mounted in the environment that are configured to share data with a plurality of vehicles. In some examples, the vehicle computing system may be configured to semantically classify the detected objects. A classification may include another vehicle (e.g., car, a pickup truck, a semi-trailer truck, a tractor, a bus, a train, etc.), a pedestrian, a bicyclist, an equestrian, or the like. For example, the vehicle computing system may detect two objects and classify a first object as a bicyclist and a second object as a pedestrian.

In various examples, the vehicle computing system may detect an object at a location in the environment. The vehicle computing system may determine that the object is relevant to a path associated with the vehicle traveling through the environment. In some examples, a determination that the object is relevant to the path is based on determining that the location is within a threshold distance of a drivable surface over which the vehicle plans to travel. In some examples, the vehicle computing system may determine that the object is relevant to the path based on a determination that the vehicle traveling along the vehicle trajectory would pass the object at less than a threshold distance (e.g., a perceived safe lateral distance for a currently planned vehicle speed when passing the object, a minimum safe distance, or another threshold distance). In some examples, the threshold distance may be based on a classification associated with the object. For example, a vehicle computing system that is programmed with a perceived safety subgoal specifying a distance of four (4) feet (or another distance) from pedestrians is associated with a perceived safe vehicle speed of 20 miles per hour (mph) may detect a pedestrian standing in a bicycle lane. The vehicle computing system may determine that the vehicle is traveling along a vehicle trajectory that would pass three feet from the pedestrian. Because three feet is a lateral distance that is less than the lateral distance associated with a perceived safe speed of 20 mph, the vehicle computing system may determine that the pedestrian is a relevant object.

In some examples, the determination of whether an object is relevant to the vehicle path may be based on a predicted object trajectory (e.g., one or more object trajectories) and/or a confidence associated with the trajectory. Predicted object trajectories may indicate a movement of the object or that the object is stationary. In some examples, the predicted object trajectory may be based on a top-down representation of an environment, such as by utilizing the techniques described in U.S. patent application Ser. No. 16/151,607 filed Oct. 4, 2018 and entitled "Trajectory Prediction on Top-Down Scenes," and in U.S. patent application Ser. No. 16/504,147 filed Jul. 5, 2019 and entitled "Prediction on Top-Down Scenes based on Action Data," the entire contents of which are incorporated herein by reference for all purposes. In some examples, the predicted object trajectory may be determined using a probabilistic heat map (e.g., discretized probability distribution), tree search methods and/or temporal logic formulae to predict object behavior, such as that described in U.S. patent application Ser. No. 15/807,521, filed Nov. 8, 2017, and entitled "Probabilistic Heat Maps for Behavior Prediction," the entire contents of which are incorporated herein by reference for all purposes. In various examples, the predicted object trajectory may be determined utilizing tree search methods, temporal logic formulae, and/or machine learning techniques. In various examples, the confidence may represent a level of certainty that the vehicle computing system may have in the accuracy of the predicted object trajectory.

In some examples, based on a determination that the object is relevant, the vehicle computing system may determine to modify the vehicle trajectory to navigate around the object. In various examples, a modification to the vehicle trajectory may include modifying a position in a lane, changing lanes, modifying a speed of the vehicle, or the like.

In various examples, the vehicle computing system may determine a cost associated with each action, such as those described in U.S. patent application Ser. No. 16/539,928 filed Aug. 13, 2019, entitled "Cost-Based Path Determination," the entire contents of which are incorporated herein by reference for all purposes. The cost may be based on the weighted perceived safe speed cost discussed above. The cost may also be based on one or more of a safety cost (e.g., safety of the vehicle and/or object, avoiding a collision between the vehicle and the object), a comfort cost (e.g., lack of abrupt movements—e.g., by penalizing large magnitude accelerations, less than a minimum distance between the vehicle and the object), a progress cost (e.g., movement toward destination), an operational rules cost (e.g., rules of the road, laws, codes, regulations, etc.), or the like. In some examples, the vehicle computing system may select the action to take based on the cost associated therewith. In some examples, the vehicle computing system may select the action based on an action having a lowest cost associated therewith, as compared to other actions. In some examples, the vehicle computing system may determine an action to take based on the cost associated therewith being less than a threshold cost.

For example, a vehicle computing system may determine that the lane in which a vehicle is operating is partially blocked by an object standing next to the lane taking pictures, but that enough of the operating lane is clear to allow safe (e.g., collision free) passage. The vehicle computing system may determine a modified trajectory to navigate around the object at a planned lateral distance and vehicle speed and then calculate a cost associated with the modified trajectory (e.g., based on the perceived safety subgoal constraints and/or weighted perceived safe speed cost discussed above). Based on a determination that the cost is at or below a threshold, the vehicle computing system may cause the vehicle to navigate passed the object at the planned lateral distance and vehicle speed. Based on a determination that the cost is above the threshold, the vehicle computing system may cause the vehicle to stop (or maintain a stopped position) prior to a location associated with the object or consider navigating to an adjacent lane to pass the object.

Similarly, the vehicle computing system may determine that a lane in which a vehicle is operating is blocked by an object standing in the lane taking pictures, but that an adjacent lane is clear of other objects. The vehicle computing system may calculate a cost associated with operating in the adjacent lane to navigate around the object. Based on a determination that the cost is at or below a threshold, the vehicle computing system may cause the vehicle to navigate into the adjacent lane around the object. Based on a determination that the cost is above the threshold, the vehicle computing system may cause the vehicle to stop (or maintain a stopped position) prior to a location associated with the object.

The techniques discussed herein may include improvements to the technical field of autonomous and/or semi-autonomous vehicle control planning. Traditionally, in control planning for an autonomous vehicle, a vehicle computing device may detect an object relevant to a path, such as a pedestrian in the road, and may stop the vehicle to wait for the pedestrian to move out of the way. While ensuring safety of the pedestrian and the vehicle, stopping to wait for objects may sacrifice other factors, such as progress and comfort for the vehicle, occupants of the vehicle, and other vehicles on the road (e.g., traffic back-up waiting for the pedestrian to move). Further, navigating around objects based on safety constraints may result in actions that, while safe (e.g., will not result in collision or injury), may be perceived as unsafe by passengers, pedestrians and/or other persons. The techniques described herein, however, include a means by which the vehicle computing system may select an action that optimizes safety, perceived safety, comfort, and progress for the vehicle. Accordingly, the techniques described herein improve the technical field of autonomous and/or semi-autonomous vehicle.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In one example, similar techniques may be utilized in driver-controlled vehicles in which such a system may provide an indication of whether it is safe or will be perceived as safe to perform various maneuvers. In another example, the techniques may be utilized in an aviation or nautical context, or in any system using planning techniques. Further, while discussed herein in the context of determining a perceived safe speed for a given lateral or passing distance, implementations are not so limited. For example, in other implementations, a perceived safe lateral or passing distance may be determined for a given speed at the passing location. Other variations would be apparent to one of skill in the art based on this disclosure.

FIG. 1 is an illustration of a process 100 for determining to navigate a vehicle 104 around an object, such as pedestrian 106. In the illustrative example, the vehicle computing system may classify the object as a pedestrian 106 (e.g., a runner, a walker, etc.). Other examples may include other classifications of objects, such as bicyclists, scooters, mopeds, or the like.

At operation 102, the process may include receiving a vehicle trajectory (e.g., for vehicle 104) and a pedestrian trajectory (e.g., pedestrian trajectory 110). At operation 112, the process may include determining lateral distance(s) between a vehicle location and a pedestrian location.

In various examples, a vehicle computing system may determine that the pedestrian 106 is relevant to the vehicle trajectory 108 based on the pedestrian trajectory 110. For example, the vehicle computing system may determine the pedestrian 106 is associated with the vehicle trajectory 108 based on a determination that at least a portion of the pedestrian will be within a threshold distance of the vehicle 104 when the vehicle 104 passes the pedestrian along the vehicle trajectory 108. In addition or alternatively, the process utilize other criteria to determine objects associated with the vehicle trajectory 108 or may detect all objects present in captured sensor data as associated with the vehicle trajectory 108.

The vehicle computing system may determine a predicted location 114 of the pedestrian 106 when the vehicle 104 passes the pedestrian 106. The vehicle computing system may then determine a passing location 116 that is a lateral distance 118 away from the predicted location 114 in a direction perpendicular to the direction the vehicle is traveling. The process may include determining a plurality of lateral distances and a plurality of associated passing locations.

At operation 120, the process may include determining, based on the lateral distance(s), associated perceived safe speed(s) for perceived safety subgoal(s). A perceived safe speed may be determined based on a lateral distance using various approaches. For example, the vehicle computing device may access a table (e.g., a look up table) of lateral distances and associated perceived safe speeds. For example, the table of perceived safe speeds may be indexed or otherwise accessible using the lateral distance as an index key or using similar data structures and retrieval algorithms. In addition or alternatively, the vehicle computing device may utilize a mathematical function to calculate the perceived safe speed based on the lateral distance. In some examples, the table of lateral distances and associated perceived safe speeds and/or the mathematical function used to calculate the perceived safe speed based on the lateral distance may be derived or determined based at least in part on an analysis of passing interactions performed by human drivers (e.g., a linear regression). An example of such an analysis is shown in FIG. 2.

Figure 2:
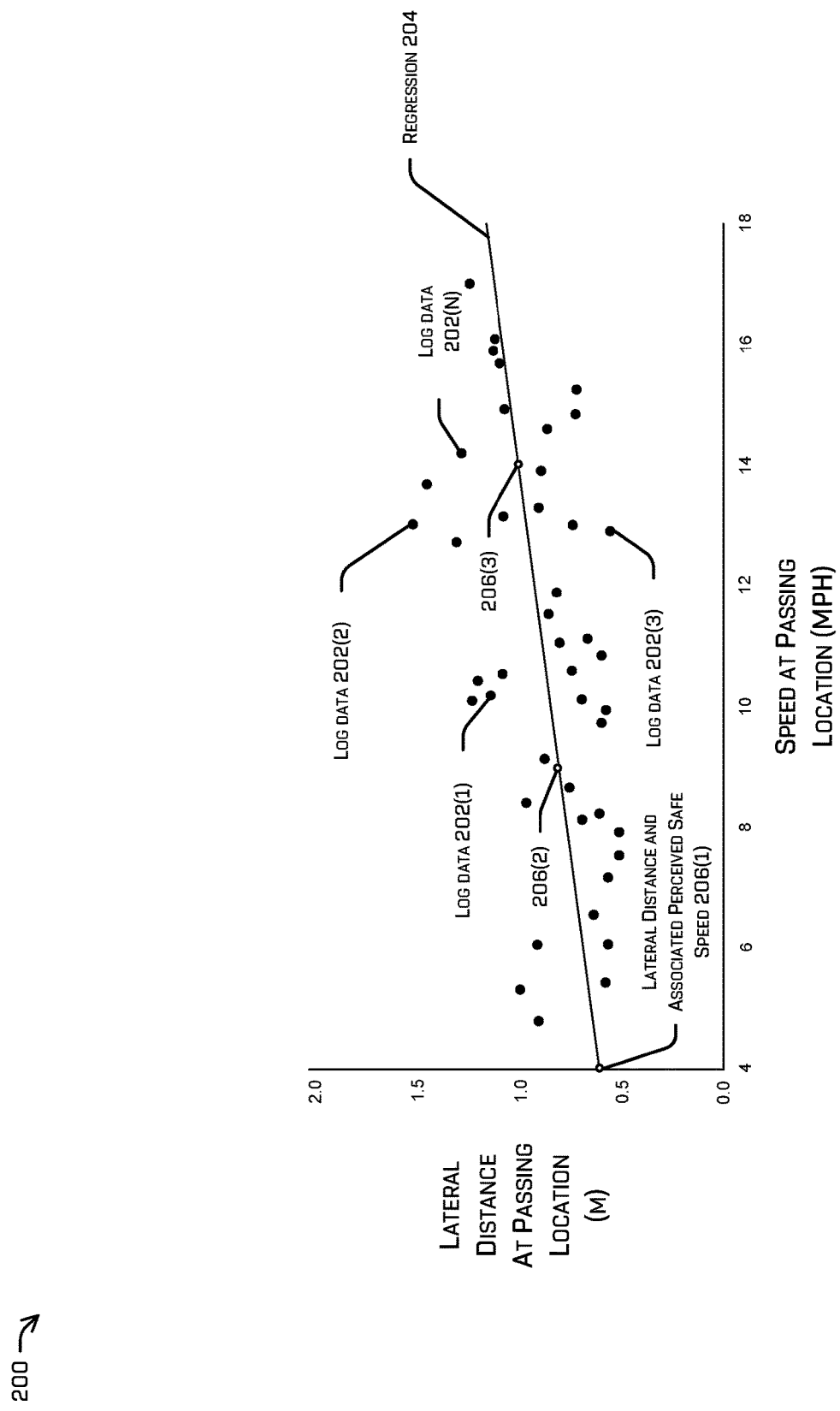
FIG. 2 is an illustration of an example data set of passing events that may be utilized to determine perceived safe speeds based on the lateral distances utilized by human drivers when passing objects.

Turning to FIG. 2, FIG. 2 illustrates an example data set of passing events that may be utilized to determine perceived safe speeds based on the lateral distances utilized by human drivers when passing objects.

As shown in FIG. 2, log data 202(1)-202(N) of passing events may be plotted using the lateral distance at the passing location as a y-axis and a speed at the passing location as an x-axis. A linear regression 204 of the log data 202 may be determined and utilized to determine lateral distances and associated perceived safe speeds 206(1)-206(3). For example, the linear regression 204 provides a perceived safe speed of four (4) miles per hour (mph) at a lateral distance of 0.6 meters (m), a perceived safe speed of eight (8) mph at a lateral distance of 0.8 m, and a perceived safe speed of 14 mph at a lateral distance of 1.0 m. Depending on the example, lateral distances and associated perceived safe speeds 206 may be derived from the regression 204 and stored in a lookup table or a mathematical function may be derived from the regression 204 and subsequently used to calculate perceived safe speeds based on lateral distances.

While the example discussed herein utilize data sets of passing events for human drivers, examples are not so limited and may include simulated passing events or specified lateral distance and perceived safe speed pairs (e.g., based on expert or user input).

In some examples, the perceived safe speed may differ based on the location associated with the object. For example, the vehicle computing system may determine a classification of the predicted location of the object when the vehicle reaches the passing location (e.g., road, sidewalk, median, grass, etc.). Each classification of location of the object may have a different associated perceived safe speed for a given lateral distance.

In some examples, a perceived safety metric (e.g., a safe speed and/or perceived safe distance can be determined based on user feedback (e.g., a driver, a pedestrian located near a vehicle, etc.). Such information can be used as ground truth data for training a machine-learned model implementing techniques disclosed herein. As further described herein, a perceived safety metric can differ from a non-perceived safety metric in different ways. For example, a perceived safety metric, based on user perception, may be customized to user preferences which may be non-linear (based on speed, etc.), adapted to local conditions, adapted to environmental conditions, etc. Whereas non-perceived safety metrics may correspond to an acceptable low risk when a vehicle passes an object (e.g., a pedestrian) based on mathematical models, perceived safety metrics may be in excess of non-perceived safety metrics to, for example, provide an acceptable perceived safe speed or distance. Use of perceived safety metrics, as opposed to non-perceived safety metrics, can impact travel time, speed, or energy usage, for example, sometimes detrimentally.

Returning to FIG. 1, at operation 122, the process may include determining modified trajector(ies) 126(1)-126(3) meeting the constraints of the perceived safety subgoals 124(1)-(3) (e.g., the lateral distance(s) and the associated perceived safe speed(s) of the passing locations 116 associated with the subgoals 124), based on the costs of the modified trajector(ies) 126. As described above, the vehicle computing system may determine a modified trajectory 126 associated therewith, based on one or more costs (e.g., perceived safety cost, safety cost, comfort cost, progress cost, operational rules cost, etc.) associated therewith. In such examples, the vehicle computing system may determine the possible the modified trajectory 126 based on the trajectory having the lowest cost associated therewith. The determination of the modified trajectory may be constrained at least in part by a perceived safety subgoal to include a vehicle speed substantially equal to the perceived safe speed when passing the pedestrian 106. More particularly, possible trajectories that do not reach the passing location while the pedestrian 106 is the lateral distance away and while the vehicle is traveling the perceived safe speed may be excluded. Although not shown here for ease of explanation in illustration, some implementations may update or otherwise account for different predicted locations 114 due to the motion of the pedestrian 106. Further, additional subgoals may be determined for the lateral distances. For example, another velocity subgoal may utilize on another model (e.g., an adversarial pedestrian model) to determine a speed associated with the lateral distance. The vehicle computing system may then determine the most conservative subgoal and utilize the most conservative subgoal to generate a trajectory.

At operation 128, the process may include controlling the vehicle based on the cost(s) of the modified trajector(ies) 126 associated with the perceived safety subgoals 124. For example, the vehicle computing system may select a modified trajectory 126 having the lowest cost among modified trajectories associated with the perceived safety subgoals 124. The vehicle computing system may then control the vehicle based on the selected modified trajectory 126.

Figure 3:
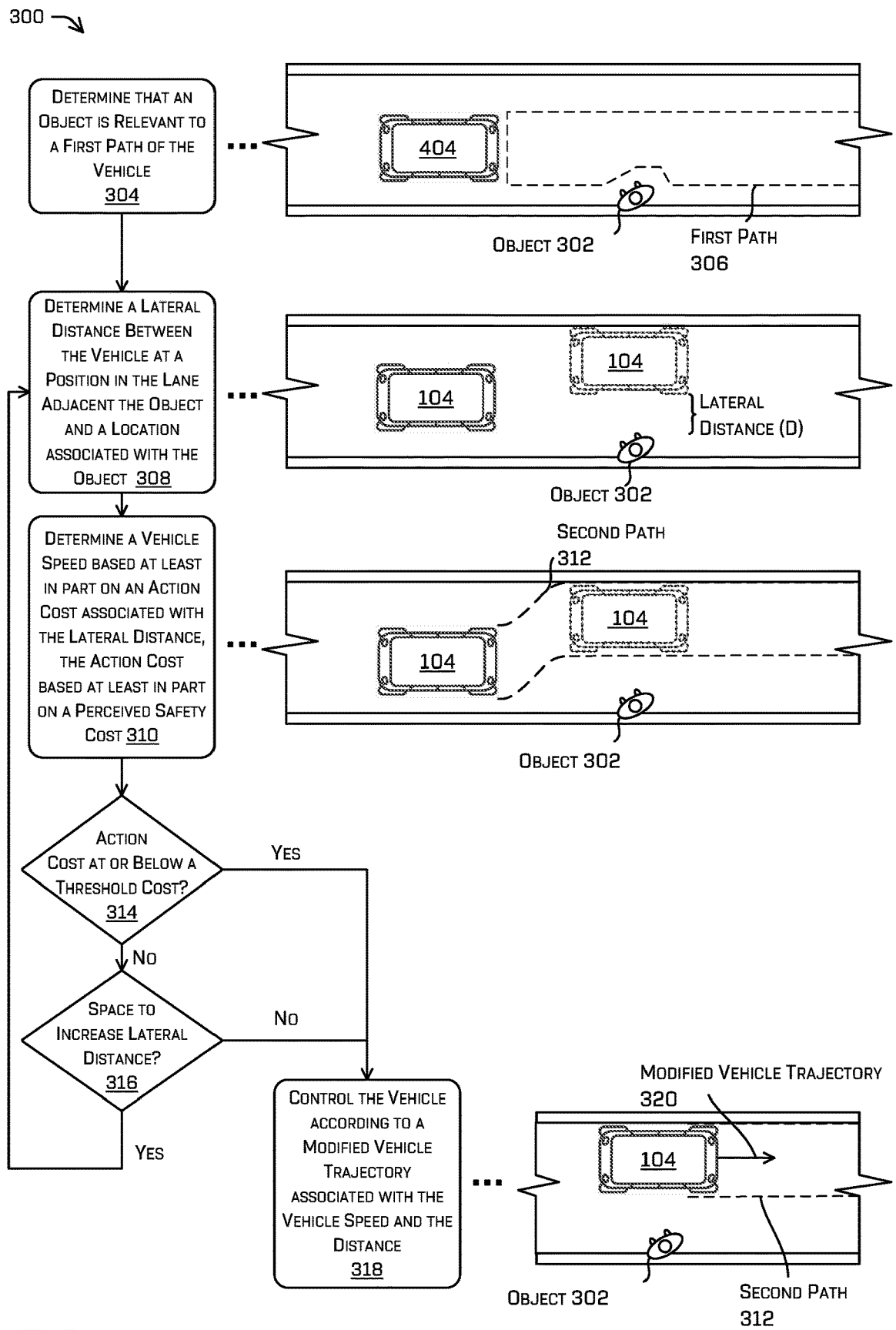
FIG. 3 is an illustration of a process for determining to navigate a vehicle around an object using a weighted perceived safe speed cost.

FIG. 3 is an illustration of a process 300 for determining to navigate a vehicle 104 around an object 302 using a weighted perceived safe speed cost.

At operation 304, the process may include determining that an object 302 is relevant to a first path 306 of the vehicle. As discussed above, a vehicle computing system may detect the object 302 based on sensor data captured by one or more sensors of the vehicle 104, other vehicles, and/or sensors mounted in an operating environment. In various examples, the first path 306 may represent a drivable area over which the vehicle 104 plans to travel according to a planned route between a first location and a destination. In some examples, the vehicle computing system may determine that a location associated with the object 302 is within a threshold distance of the first path 306. In some examples, based on a determination that the object 302 is relevant to the first path 306 of the vehicle 104, the vehicle computing system may fuse the object 302 into the drivable area, such as described in U.S. patent application Ser. No. 15/982,694, incorporated by reference above. In the illustrative example, the fusion is depicted as a cut-out of the drivable area. The cut-out may include a buffer distance (e.g., minimum safe distance ((e.g., 3 inches, 6 inches, etc.)) for the vehicle 104 to maintain from the object 302.

At operation 308, the process may include determining a lateral distance (D) between the vehicle 104 at a position adjacent the object 302 and a location associated with the object 302. In some examples, the lateral distance from the object 302 may include a lateral distance between a minimum safe distance to avoid collision and a maximum lateral distance. In various examples, the vehicle computing system may determine a distance between the object 302 and an opposite edge of the lane (e.g., distance from the object to a lane marker). In such examples, the vehicle computing system may subtract a width of the vehicle and/or a safety buffer (e.g., 3 inches, 6 inches, etc.) from the distance between the object and the lane marker to determine the maximum lateral distance between the vehicle at the location abeam the object and the location associated with the object. In the illustrated example of FIG. 3, an initially selected lateral distance may be the minimum safe distance.

At 310, the process may include determining a vehicle speed based at least in part on an action cost associated with the lateral distance, the action cost based at least in part on a perceived safety cost. In various examples, the vehicle speed may be determined based on optimizing the action cost associated with circumnavigating the object 302 at the lateral distance (D). In such examples, the vehicle computing system may calculate action costs associated with one or more speeds and may select the speed associated with the lowest action cost. For example, the vehicle computing system may determine a first action cost associated with passing 3 meters from the object at 10 miles per hour, a second action cost associated with passing 3 meters from the object at 15 miles per hour, and a third action cost associated with passing 3 meters from the object at 20 miles per hour. The vehicle computing system may select the lowest cost action as the action for the vehicle to perform.

As mentioned above, the cost optimization determination for the vehicle speed may be based at least in part on a weighted perceived safe speed cost. For example, the costs of the vehicle speed(s) may be based on the lateral distance(s) (e.g., lateral distance (D)). In such examples, the greater the distance above the minimum safe distance, the faster the vehicle 104 may travel without being perceived as unsafe. For example, the perceived safe speed associated with the vehicle 104 navigating around the object 302 at the minimum safe distance (e.g., 1 meter) may be 5 miles per hour and at the maximum lateral position in the lane (e.g., 2 meters) may be 12 miles per hour. The vehicle speeds discussed are merely illustrative, and any other speeds are contemplated herein.

The weighted perceived safe speed cost may be determined based on an excess of the planned vehicle speed over a perceived safe speed associated with the lateral distance (D).

In some examples, the weight given to the weighted perceived safe speed cost in the cost optimization may vary based on the planned lateral distance (D) and/or the distance remaining to the object. For example, a weight of the weighted perceived safe speed cost may increase (e.g., linearly, logarithmically, exponentially, etc.) as the planned lateral distance (D) decreases. In such an example, as the planned lateral distance (D) decreases, the tolerance for deviation from the perceived safe speeds may also decrease. Similarly, a weight of the weighted perceived safe speed cost may increase (e.g., linearly, logarithmically, exponentially, etc.) as the distance remaining to the object decreases. In some examples, the weight may be determined based on the distance remaining to the object such that the vehicle begins reacting to the presence of the object at a remaining distance that may be perceived as natural and comfortable (e.g., similar to what a human driver may be expected to do). For example, the weight may be minimal prior to a distance of four (4) car lengths, with the weight increasing as the distance decreases below four (4) car lengths.

In various examples, the perceived safe speed(s) may be based in part on the classification associated with the object 302. In such examples, the vehicle computing system may determine the classification associated with the object 302 and may determine the perceived safe speed(s) based in part on the classification. In some examples, different classifications of objects (or groups of classifications) may include (e.g., wheeled vehicles (e.g., bicycles, scooters, mopeds, etc.), pedestrians (e.g., runners, walkers, people standing in place, etc.)), or the like. For example, for a given lateral distance, the perceived safe speed for passing a bicyclist may be greater than the perceived safe speed for passing a pedestrian.

In certain examples, perceived safe speed(s) can be determined based on a characterization of an environment or a location. For example, perceived safe speeds may vary based on whether a vehicle is operating in an urban or rural environment. In some examples, a certain city may be associated with perceived safe speed(s) that may be different from other cities. For example, perceived safe speed(s) associated with New York City may be different than perceived safe speed(s) for Atlanta.

In various examples, the perceived safe speed(s) associated with the lateral distances and/or classifications may be pre-determined. For example, the vehicle computing system may have stored therein a look-up table of perceived safe speed(s) and lateral distances associated with circumnavigating objects 302. In some examples, the table of perceived safe speed(s) may be associated with a particular classification associated with the object 302. In various examples, the perceived safe speed(s) associated with the lateral distances and/or classifications may be dynamically determined based on one or more environmental conditions. The environmental conditions may include weather considerations (e.g., rain, snow, etc.), road conditions (e.g., smooth surface, gravel, potholes, etc.), density of objects (e.g., number of vehicles, pedestrians, etc. in the environment), proximity to other objects (e.g., in an adjacent lane, etc.), and the like. In various examples, a dynamic determination of the perceived safe speed may include adjusting the pre-determined perceived safe speeds associated with lateral distances and/or classifications for the environmental conditions. For example, the vehicle computing system may determine that a perceived safe speed associated with a lateral distance from the object 302 is 10 kilometers per hour and that, due to the rain and wet road surface, the perceived safe speed should be 8 kilometers per hour.

In various examples, responsive to determining a lateral distance and vehicle speed at which to pass the object 302, the vehicle computing system may determine a second path 312. The second path 312 may include a width of the vehicle traveling a trajectory associated with the distance and the vehicle speed. In various examples, the second path 312 may include the width of the vehicle plus a buffer distance (e.g., 6 inches, 8 inches, etc.). In such examples, the buffer distance may include a safety buffer on one or both sides of the vehicle.

In various examples, the second path may be determined based on the action cost optimization that determined the vehicle speed. As discussed above, the vehicle computing system may determine action costs associated with multiple actions and may determine the action based on a lowest cost action. In some examples, the vehicle computing system may determine the trajectory associated with the lowest cost action and may cause the vehicle to travel along the trajectory associated with the lowest cost action (e.g., optimized action). For example, the actions may include navigating around the object at various lateral distances (e.g., lateral distances associated with staying in the lane, partially changing lanes, fully changing lanes, etc.) and various speeds. The selected action (e.g., optimal action) may include the action associated with a lowest overall cost (e.g., total cost including perceived safety cost, safety cost, progress cost, comfort cost, and/or operational rules cost).

At operation 314, the process may include determining whether an action cost associated with circumnavigating the object according to the second path is at or below a threshold cost. If not, the process may continue to operation 316. Otherwise, the process may continue to operation 318. The threshold cost may include a pre-determined maximum cost associated with an action. The threshold cost may ensure maximized safety and performance of the vehicle operating in the environment. In various examples, the threshold cost may be associated with a constraint on a vehicle action. In such examples, the constraint may prevent the vehicle computing system from selecting one or more actions based on high costs (e.g., perceived safety, safety, comfort, progress, operational rules costs, etc.). For example, a threshold cost may be associated with a maximum perceived safety cost and the vehicle computing system may be prevented from performing an action that would be perceived as overly unsafe by a passenger of the vehicle, a person associated with the object, or the like.

At 316, the process may determine if there is more space to increase the lateral distance (D). In some examples, the vehicle computing system may determine if there is more space to increase the lateral distance (D) if there is more space available in the lane or if there is more space available in a safe driving area (e.g., in the lane or an adjacent lane). If so, the process may continue to operation 308 for additional operations based on an increased lateral distance. Upon returning to 308, the process may increase the lateral distance (D) to a value at or below the remaining space available in the current lane, a distance that includes part or all of an adjacent lane, or a maximum lateral distance possible. Otherwise, the process may continue at 318. In cases in which the process continues to 318 from 316, the operation at 316 may be based on the current lateral distance and speed or may be select a previous lateral distance and speed which had a lower action cost. Additionally or alternatively, the vehicle computing system may have an additional threshold which may determine whether all the trajectories considered were unacceptable. In such a case, the vehicle computing system may operate to conduct a safety action, such as stopping the vehicle or evaluating other safety maneuver(s).

At operation 318, the process may include controlling the vehicle according to a modified vehicle trajectory 320 associated with the second path (e.g., based on the vehicle speed (determined at operation 310) and the lateral distance (determined at operation 308)). The vehicle computing system may cause the vehicle to circumnavigate the object 302 on the modified vehicle trajectory 320. As will be discussed in greater detail below with regard to FIG. 5, the vehicle computing system may cause one or more drive system(s) to move the vehicle 104 along the second path 312 according to the modified vehicle trajectory 320.

While the examples discussed above relate to using perceived safety subgoal constraints or perceived safety costs, other examples may include both perceived safety features.

Figure 4:
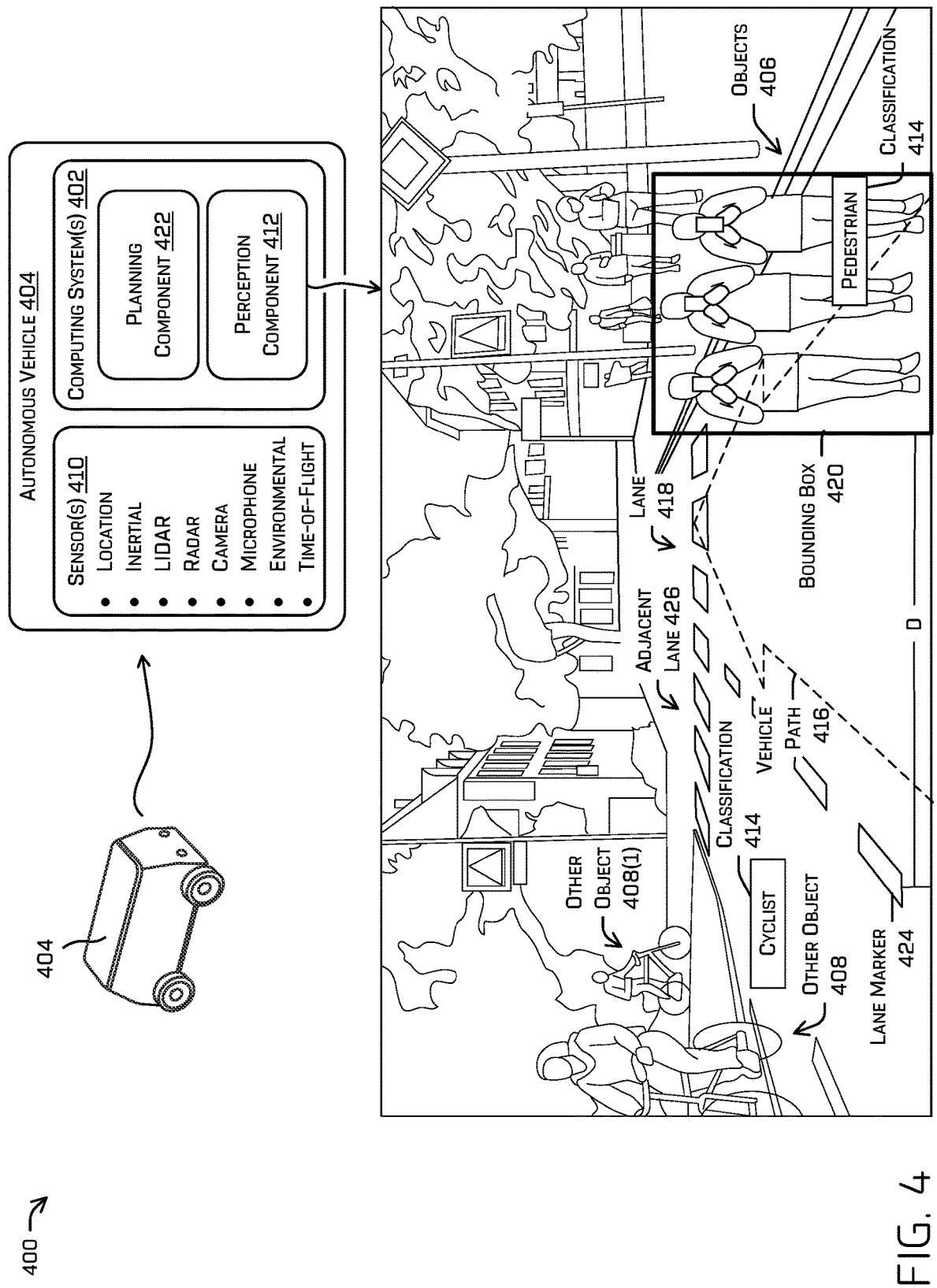
FIG. 4 is an illustration an environment, in which an example object avoidance system may be used by an autonomous vehicle to circumnavigate an object in the environment.

FIG. 4 is an illustration an environment 400 in which one or more computing systems 402 of an autonomous vehicle 404 (e.g., vehicle 104) may detect one or more objects 406 relevant to a path of the vehicle 404 and control the vehicle 404 based on a likelihood that the object(s) 406 will move out of the path of the vehicle 404. Object(s) 406 may include those that impede forward progress of the vehicle 404 along a pre-defined route and/or determined trajectory (e.g., speed and/or direction of travel) associated with travel from a location to a destination. Such determination may be based on a threshold speed of the vehicle and/or a progress cost associated with the vehicle, as otherwise discussed herein. The object(s) may be substantially stationary (e.g., pedestrians standing and/or milling about in front of the vehicle 404, etc.) and/or dynamic (e.g., bicyclist in the road in front of the vehicle 404 traveling at a speed slower than that associated with a trajectory of the vehicle 404, pedestrians walking in the road in front of the vehicle 404, such as those navigating around a construction zone, etc.). The vehicle 404 may detect the object(s) 406 and one or more other objects 408 based on sensor data captured by one or more sensors 410 of the vehicle 404. The sensor data captured by the sensor(s) 410 may include data captured by lidar sensors, camera sensors, radar sensors, time-of-flight sensors, sonar sensors, and the like.

In some examples, the sensor data can be provided to a perception component 412 configured to determine a classification 414 associated with the object(s) 406 and/or the other object(s) 408 (e.g., vehicle, pedestrian, bicycle, motorcycle, animal, and the like). In various examples, the perception component 412 may determine an object classification 414 based on one or more features associated with the object(s) 406 and/or the other object(s) 408. The features may include a size (e.g., width, height, depth, etc.), shape (e.g., geometry, symmetry, etc.), and/or other distinguishing features of the objects 406 and/or 408. For example, the perception component 412 may recognize the size and/or shape of the object(s) 406 correspond to pedestrians and the other object 408 corresponds to a cyclist.

In various examples, the perception component 412 may be configured to determine that the object(s) 406 within a threshold distance of a vehicle path 416 (path 416) associated with vehicle 404 travel through the environment 400. In some examples, the vehicle path 416 may include a path of the vehicle 404 from a current location to a destination. In some examples, the path 416 may include a drivable surface (e.g., drivable area) associated with the vehicle 404 travel to the destination. In some examples, the drivable surface may include a width of the vehicle 404 and/or a safety margin on either side of the vehicle 404. In some examples, the drivable surface may include the width of the lane 418.

In some examples, the perception component 412 may determine that the object is within a threshold distance of the path based on a determination that the vehicle traveling along the vehicle trajectory would pass the object at less than the threshold distance (e.g., a perceived safe lateral distance for a currently planned vehicle speed when passing the object, a minimum safe distance, or another threshold distance). In some examples, the threshold distance may be based on a classification associated with the object. For example, a vehicle computing system that is programmed with a perceived safe lateral distance of four (4) feet (or another distance) from pedestrians when traveling 20 miles per hour (mph) may detect a pedestrian standing in a bicycle lane. The vehicle computing system may determine that the vehicle is traveling along a vehicle trajectory that would pass three feet from the pedestrian. Because three feet is a lateral distance that is less than the perceived safe lateral (e.g., threshold) distance for 20 mph, the vehicle computing system may determine that the pedestrian is a relevant object.

In the illustrative example, at least a portion of each of the three objects 406 is located within the vehicle path 416. In other examples, based on a determination that at least a portion of at least one of the objects 406 is within a threshold distance of the path 416, the perception component 412 may determine that the group of three pedestrians are designated as objects 406. In some examples, based on a determination that at least a portion of at least one of the objects 406 is within a threshold distance of the path 416, the perception component 412 may generate a bounding box 420 around the group of objects 406. In such examples, the perception component 412 may consider the group of objects 406 together.

In various examples, based on a determination that the object(s) 406 are within a threshold distance of the path 416, the perception component 412 may fuse the object(s) 406 into the drivable area of the vehicle 404, such as that described in U.S. patent application Ser. No. 15/982,694 filed May 17, 3018 and entitled "Drive Envelope Determination", the entire contents of which are incorporated herein by reference for all purposes. In such examples, the fusion of the object(s) 406 includes a modification of the drivable area such that the location occupied by the object(s) 406 is removed from the available drivable surfaces (e.g., no longer an area in which the vehicle 404 may travel). In some examples, a reference line associated with the vehicle path 416 (e.g., centerline of vehicle movement) may shift a distance away from the object(s) 406. The distance may include a minimum safe distance or greater distance away from the object(s) 406.

In various examples, the perception component 412 may be configured to provide the sensor data (e.g., relevant object determinations, classifications of objects 406, etc.) to the planning component 422 for determining an action for the vehicle to take.

In various examples, the action may include modifying a vehicle trajectory to cause the vehicle 404 to travel a second path (e.g., different path). The second path may include a vehicle path 416 that circumnavigates the object(s) 406. The second path and/or associated vehicle trajectory may result in the vehicle 404 continuing progress toward the destination while avoiding the object(s) 406 by at least a minimum safe distance. The vehicle trajectory and/or second path may be associated with a position of the vehicle 404 in the lane 418, a lane change (e.g., into an adjacent lane 426), and/or adjusting a position of the vehicle 404 at least partially outside the lane 418 (e.g., onto a shoulder, into a bike lane, or the like) to safely navigate around the object(s) 406.

In various examples, the action may include adjusting a position in a lane 418 to navigate around the object(s) 406. In some examples, the planning component 422 may determine whether the vehicle 404 is able to proceed around the object(s) 406 in the lane 418 (e.g., whether adjusting a position is a viable action). In such examples, the planning component 422 may determine the distance (D) between the object(s) 406 and/or the bounding box 420 associated therewith and a lane marker 424 (e.g., road marking delineating the edge of the lane, etc.). The planning component 422 may determine whether the distance (D) is equal to or greater than a width of the vehicle 404 and/or a safety buffer (e.g., minimum safe distance) from the object(s) 406. As discussed above, the minimum safe distance may be based on the classification 414 associated with the object(s) 406.

In various examples, based on a determination that the distance (D) is equal to or greater than the width of the vehicle 404 plus the minimum safe distance, the planning component 422 may determine that the adjusting a position in the lane 418 is a viable action. In such examples, the vehicle 404 at a maximum lateral distance in the lane 418 from the object(s) 406 may be at least the minimum safe distance from the object(s) 406. In various examples, the planning component 422 may determine that adjusting a position in the lane 418 is a viable action based at least in part on an action cost associated therewith. As discussed in further detail below, the planning component 422 may determine action costs associated with an action, such as adjusting a position in a lane on a first trajectory associated with a first distance from the object(s) 406 and a first speed, adjusting a position in the lane on a second trajectory associated with a second distance from the object(s) 406 and a second speed, and the like. In at least some such examples, such costs may include, for example, a cost based on a width available in the lane (e.g., such that the cost increases exponentially relative to a width of the vehicle and/or an additional buffer). As a non-limiting example, the cost may be polynomialy, exponentially, or otherwise a function of a width of a lane relative to a threshold width. In some examples, such a cost may be based on a distance to nearest objects, which may include boundaries of the drivable surface. In various examples, the planning component 422 may determine action costs associated with each potential action and may select an action based on the respective action cost. In some examples, the action may be determined based on a cost optimization. In such examples, a most cost-effective action may be selected for the vehicle.

In some examples, based on a determination of viability, the planning component 422 may determine one or more speeds associated the vehicle navigating around the object(s) 406 at one or more lateral distances. The lateral distance(s) may include one or more lateral distances that are equal to or greater than the minimum safe distance between the vehicle 404 in the lane 418 and the object(s) 406. In other words, the lateral distance(s) may include any lateral distance associated with the vehicle 404 passage within the confines of the lane 418 and outside the minimum safe distance. In various examples, the speed may be determined based on the perceived safety subgoal constraints or perceived safety subgoal cost optimization described above. In such examples, the distance and/or speed may be constrained to perceived safe speeds associated with lateral distances and/or determined based on a most cost-effective action for the vehicle to take (e.g., lowest cost action). In examples utilizing perceived safety subgoal constraints, the determination of the modified trajectory may be constrained at least in part to include a vehicle speed substantially equal to the perceived safe speed when passing the object(s) 406. More particularly, possible trajectories that do not reach the passing location while the object(s) 406 are the lateral distance away and while the vehicle is traveling the perceived safe speed may be excluded.

As mentioned above, the cost optimization determination for the passing speed may be based at least in part on a weighted perceived safe speed cost. For example, the costs of the speed(s) may be based on the lateral distance(s). In such examples, the greater the lateral distance above the minimum safe distance, the faster the vehicle 404 may travel without being perceived as unsafe.

The weighted perceived safe speed cost may be determined based on an excess of the planned vehicle speed over a perceived safe speed associated with the planned lateral distance. The perceived safe speed may be determined from the planned lateral distance using various approaches. For example, the planning component 422 may access a table (e.g., a look up table) of lateral distances and associated perceived safe speeds corresponding to objects 406 in the lane 418. For example, the table of perceived safe speeds may be indexed or otherwise accessible using the lateral distance as an index key or using similar data structures and retrieval algorithms. In addition or alternatively, the planning component 422 may utilize a mathematical function to calculate the perceived safe speed based on the planned lateral distance. In some examples, the table of lateral distances and associated perceived safe speeds and/or mathematical function to calculate the perceived safe speed based on the planned lateral distance may be derived or determined based at least in part on an analysis of passing interactions performed by human drivers (e.g., a linear regression).

In some examples, the weight given to the weighted perceived safe speed cost in the cost optimization may vary based on the planned lateral distance and/or the distance remaining to the object. For example, a weight of the weighted perceived safe speed cost may increase (e.g., linearly, logarithmically, exponentially, etc.) as the planned lateral distance decreases. In such an example, as the planned lateral distance decreases, the tolerance for deviation from the perceived safe speeds may also decrease. Similarly, a weight of the weighted perceived safe speed cost may increase (e.g., linearly, logarithmically, exponentially, etc.) as the distance remaining to the object decreases. In some examples, the weight may be determined based on the distance remaining to the object such that the vehicle begins reacting to the presence of the object at a remaining distance that may be perceived as natural and comfortable (e.g., similar to what a human driver may be expected to do). For example, the weight may be minimal prior to a distance of four (4) car lengths, with the weight increasing as the remaining distance decreases below four (4) car lengths.

In some examples, when a path or trajectory for a currently planned lateral distance cannot be planned which meets a perceived safe speed cost threshold or cannot otherwise match perceived safety constraints, the vehicle computing system may cause paths with other lateral distances or paths including partial or complete lane changes to be considered.

In various examples, the vehicle 404 may be limited to a maximum vehicle speed while navigating around the object(s) 406 (e.g., in addition to the cost optimization based at least in part on the weighted perceived safe speed cost). In such examples, the planning component 422 may limit the vehicle 404 speed to the maximum vehicle speed. In some examples, the maximum vehicle speed may include a relative speed between the vehicle 404 and the object 406. For example, the vehicle 404 may be limited to passing the object 406 at 15 miles per hour (or other speed) relative to a speed associated with an object trajectory.

In some examples, the perceived safe speed(s) and/or maximum vehicle speed may be based on a classification 414 associated with the object(s) 406. For example, a maximum vehicle speed at which a vehicle 404 may pass a cyclist may be 15 kilometers per hour and a maximum vehicle speed at which the vehicle 404 may pass a pedestrian may be 10 kilometers per hour, though these are merely illustrative example speeds and any other speeds are contemplated herein. For another example, the planning component 422 may access a first table of lateral distances and associated perceived safe speeds corresponding to passing a cyclist in the lane 418 and a second table of lateral distances and associated perceived safe speeds corresponding to passing a pedestrian, such as that illustrated in FIGS. 2 and 3.

In various examples, the action may include at least partially changing lanes into an adjacent lane 426. In some examples, a lane change may include at least a portion of the vehicle 404 exiting the lane 418 and entering an adjacent lane 426, a shoulder of the road, bicycle lane, or the like. In various examples, the planning component may determine to change lanes based on a determination that a positional adjustment in the lane 418 is not viable. In some examples, actions associated with lane changes may be limited by the color and/or style (e.g., broken, solid, double line, etc.) of lane marker 424 and/or environmental factors (e.g., road curvature, speed limit, etc.). In such examples, the planning component 422 may be configured to determine whether a lane change is a viable action based on the color and/or style of the lane marker 424 and/or the environmental factors. For example, the vehicle 404 may cross a double yellow solid lane marker 424 based on a determination that the speed limit is below a threshold speed limit and the road is substantially straight (e.g., not curved).

In various examples, the planning component 422 may determine that the adjacent lane 426 is clear of other objects 408. In some examples, the planning component 422 may determine that a threshold area of the adjacent lane 426 is clear of the other objects 408. In some examples, the threshold area may include at least a width of the vehicle 404 that will be in the adjacent lane 426 and/or a safety buffer (e.g., minimum safe distance) from the other objects 408. In some examples, the threshold area may be associated with an area necessary to transition at least partially into the adjacent lane 426 without encroaching within a threshold distance (e.g., minimum safe distance) in front of, behind, or laterally from another object 408. In some examples, the perception component 412 may provide data corresponding to occupancy of the adjacent lane 426 to the planning component 422.

In some examples, the adjacent lane 426 may be associated with traffic traveling in a same direction as the vehicle 404. In such examples, the planning component 422 may determine to move into the adjacent lane 426 to circumnavigate the object(s) 406 and may continue along a second path 416 in the adjacent lane 426 to a destination. In the illustrative example, the adjacent lane 426 may be associated with opposite direction traffic. In such an example, the planning component 422, such as via sensor data provided by the perception component 412, may determine that the adjacent lane 426 is clear of oncoming traffic. In various examples, the threshold area associated with the adjacent lane 426 with opposite direction traffic may include an area encompassing a distance that the vehicle 404 will travel around the object(s) 406 plus a distance that another object 408 would cover (e.g., at the speed limit associated with the environment 400) in a time necessary for the vehicle to circumnavigate the object(s) 406. In some examples, based on a determination that another object 408 is occupying the threshold area, the planning component 422 may cause the vehicle 404 to yield to the other object 408 prior to proceeding along the second path.

In various examples, the planning component 422 may determine an action to take based upon costs associated therewith. In such examples, the planning component 422 may compare costs associated with one or more different actions (e.g., adjusting a position in the lane, changing lanes partially, full lane change, maintaining a stopped position to wait for the object(s) 406 to move, etc.) and select a lowest cost action. In various examples, the planning component 422 may determine costs associated with various iterations of each action. In such examples, the planning component 422 may determine costs associated with adjusting a position in the lane and/or partially or fully changing lanes at different distances and/or speeds. In various examples, the planning component 422 may determine an action to take based on an optimization of the costs associated with each different action and/or iteration of the action.

In some examples, the cost may be based at least in part on the weighted perceived safe speed cost discussed above. The cost may also be based on safety (e.g., avoiding a collision between the vehicle 404 and the object(s) 406 and other objects 408), comfort (e.g., lack of abrupt movements of the vehicle 404), progress (e.g., movement of vehicle 404 toward destination), operating rules (e.g., rules of the road, laws, codes, regulations, etc.), and the like, such as those described in U.S. patent application Ser. No. 16/539,928, the entire contents of which are incorporated herein by reference above.

In some examples, the cost associated with safety (e.g., safety cost) may be based on a probability of collision between the vehicle 404 and the object(s) 406 and other objects 408. In some examples, the safety cost may include a fixed cost (e.g., 60, 80, 400, etc.) if a probability of collision is greater than a predefined threshold indicating that a collision is likely (e.g., 40%, 51%, etc.). In some examples, the fixed cost may include a cost value above a threshold such that the vehicle computing system could not select the action associated therewith. In such examples, the probability of collision may include a constraint on actions the vehicle 404 may take.

In some examples, the safety cost may be based on relative positions and/or trajectories between the vehicle 404 and the object(s) 406 and/or other objects 408. In such examples, the safety cost may increase the closer a vehicle 404 (traveling on a vehicle trajectory) gets to the object(s) 406 and other objects 408. In some examples, the safety cost may be based on the classification 414 associated with the object(s) 406 and other objects 408.

In various examples, a comfort cost may be associated with an estimated acceleration (e.g., positive, negative, lateral, etc.) and/or an estimated change in acceleration (e.g., jerk) associated with a vehicle trajectory corresponding to a second path around the object(s) 406. In some examples, the comfort cost may be associated with a distance between the vehicle 404 performing the associated action and the object(s) 406 and other objects 408. In such examples, the comfort cost may be associated with a closest point of approach between the vehicle 404 and the object(s) 406 and other objects 408. In some examples, the comfort cost may be associated with a passing speed associated with the action. In some examples, the comfort cost may be associated with a relative speed between the vehicle 404 and the object(s) 406 and other objects 408. In some examples, the distance and/or speeds associated with the comfort cost may be based on the classification 414 associated with the object(s) 406 and other objects 408. In other examples, any other state/control of the vehicle 404 and/or considered objects 406 and/or 408 may be used in determining the comfort cost (e.g., how close to other vehicles—as may be computed as a nearest neighbors, or next nearest neighbors, steering rates, rotation rates, velocities, and the like).

In various examples, a progress cost may include the progress of the vehicle 404 moving toward a destination. In some examples, the progress cost may be calculated based on a change in velocity of the vehicle 404 and/or a delay of the vehicle 404 caused by the vehicle stopping, slowing down, etc. In some examples, the progress cost may include a value substantially similar to the number of seconds of delay attributed to the action. In such examples, an action including the vehicle stopping and/or maintaining a stopped position to wait for the object(s) 406 to move out of the path 416 may be associated with a higher progress cost than that associated with an action including navigation around the object(s) 406.

In various examples, an operational rules cost may be based on rules of the road (e.g., department of transportation laws, codes, regulations, etc.), rules of good driving, regional driving habits (e.g., common driving practices), driving courtesies (e.g., adjusting a position in a lane to provide space for another car to pass for a right-hand turn, not occupying a bike lane, etc.). In various examples, the operational rules cost associated with an action may be calculated based on one or more rules that are broken and/or satisfied. In such examples, the operational rules cost may be increased based on rules (e.g., regulations, habits, courtesies, etc.) that are broken or unfulfilled and/or decreased based on rules that are satisfied or fulfilled. For example, an action associated with changing a lane into oncoming traffic may include breaking a rule that the vehicle 404 should remain in the lane 418 designated for traffic operating in a direction associated with the vehicle path 416. The action may include a higher operational rules cost than an action involving a positional adjustment of the vehicle 404 in the lane 418.

In various examples, the operational rules cost may be determined based rules, regulations, etc. associated with the lane marker 424. In such examples, the color of the lane marker 424 and/or whether the lane marker 424 is solid and/or broken may contribute to the operational rules cost associated with an action. For example, an action associated with crossing a double yellow line may have a high operational rules cost (e.g., 40, 50, etc.) associated therewith. For another example, a broken white line may have a low operational rules cost (e.g., 5, 10, etc.) associated therewith.

In various examples, the costs may be ranked or weighted in order of importance. In some examples, the at least one of the costs (e.g., perceived safety, safety, comfort, progress, operational rules) may include a cost that is weighed higher than the other costs. For example, safety may be weighed higher than other factors. In such an example, the planning component 422 may emphasize safety above other factors in a determination of an action for the vehicle 404 to take. Further, as mentioned above, the weighted perceived safety cost may have a weight that varies based on the planned lateral distance and/or the remaining distance to the object 406. For example, a weight of the weighted perceived safe speed cost may increase (e.g., linearly, logarithmically, exponentially, etc.) as the planned lateral distance decreases. In such an example, as the planned lateral distance decreases, the tolerance for deviation from the perceived safe speeds may also decrease. Similarly, a weight of the weighted perceived safe speed cost may increase (e.g., linearly, logarithmically, exponentially, etc.) as the distance remaining to the object decreases. In some examples, the weight may be determined based on the distance remaining to the object such that the vehicle begins reacting to the presence of the object at a distance that may be perceived as natural and comfortable (e.g., similar to what a human driver may be expected to do). For example, the weight may be minimal prior to a distance of four (4) car lengths, with the weight increasing as the distance decreases below four (4) car lengths.

In various examples, the planning component 422 may cause the vehicle 404 to perform an action associated with circumnavigating the object(s) 406. In such an example, the planning component 422 may continue to receive sensor data corresponding to the environment 400 from the perception component 412. The sensor data may include data associated with the object(s) 406 and/or other objects 408. In various examples, the perception component 412 may be configured to process the sensor data and determine predicted object trajectories associated with the object(s) 406 and/or other objects 408. In such examples, the predicted object trajectories may include updated object trajectories associated with the object(s) 406.

Figure 5:
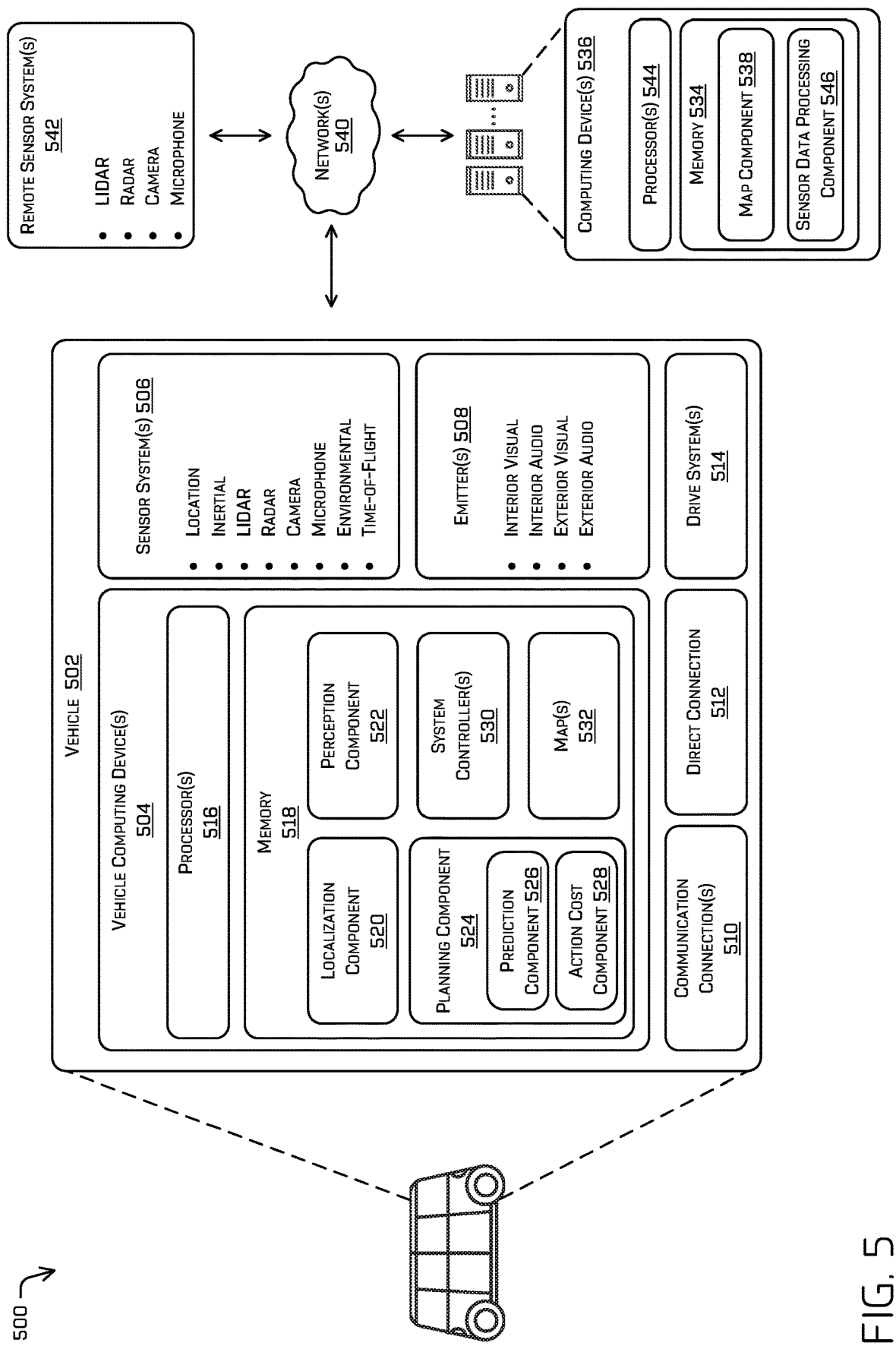
FIG. 5 is a block diagram of an example system for implementing the techniques described herein.

FIG. 5 is a block diagram of an example system 500 for implementing the techniques described herein. In at least one example, the system 500 may include a vehicle 502, such as vehicle 104. The vehicle 502 may include one or more vehicle computing devices 504, one or more sensor systems 506, one or more emitters 508, one or more communication connections 510, at least one direct connection 512, and one or more drive systems 514.

The vehicle computing device(s) 504 may include one or more processors 516 and memory 518 communicatively coupled with the one or more processors 516. In the illustrated example, the vehicle 502 is an autonomous vehicle; however, the vehicle 502 could be any other type of vehicle, such as a semi-autonomous vehicle, or any other system having at least an image capture device (e.g., a camera enabled smartphone). In the illustrated example, the memory 518 of the vehicle computing device(s) 504 stores a localization component 520, a perception component 522, a planning component 524 including a prediction component 526 and an action cost component 528, one or more system controllers 530, and one or more maps 532. Though depicted in FIG. 4 as residing in the memory 518 for illustrative purposes, it is contemplated that the localization component 520, a perception component 522, a planning component 524, one or more system controllers 530, one or more maps 532, the prediction component 526 and the action cost component 528 may additionally, or alternatively, be accessible to the vehicle 502 (e.g., stored on, or otherwise accessible by, memory remote from the vehicle 502, such as, for example, on memory 534 of one or more computing devices 536). For example, the memory 534 may store an action cost component 528 accessible by the planning component 524 of the vehicle 502.

In at least one example, the localization component 520 may include functionality to receive data from the sensor system(s) 506 to determine a position and/or orientation of the vehicle 502 (e.g., one or more of an x-, y-, z-position, roll, pitch, or yaw). For example, the localization component 520 may include and/or request/receive a map of an environment, such as from map(s) 532, and may continuously determine a location and/or orientation of the autonomous vehicle within the map. In some instances, the localization component 520 may utilize SLAM (simultaneous localization and mapping), CLAMS (calibration, localization and mapping, simultaneously), relative SLAM, bundle adjustment, nonlinear least squares optimization, or the like to receive image data, lidar data, radar data, IMU data, GPS data, wheel encoder data, and the like to accurately determine a location of the autonomous vehicle. In some instances, the localization component 520 may provide data to various components of the vehicle 502 to determine an initial position of an autonomous vehicle for determining the relevance of an object to the vehicle 502, as discussed herein.

In some examples, the perception component 522, such as perception component 412, may include functionality to perform object detection, segmentation, and/or classification. In some examples, the perception component 522 may provide processed sensor data that indicates a presence of an object (e.g., entity) that is proximate to the vehicle 502 and/or a classification of the object as an object type (e.g., car, pedestrian, cyclist, animal, building, tree, road surface, curb, sidewalk, unknown, etc.). In some examples, the perception component 522 may provide processed sensor data that indicates a presence of a stationary entity that is proximate to the vehicle 502 and/or a classification of the stationary entity as a type (e.g., building, tree, road surface, curb, sidewalk, unknown, etc.). In various examples, the perception component 522 may provide processed sensor data that indicates the presence of a blocking entity (e.g., object).

In some examples, the perception component 522 may determine that a detected entity (e.g., object) is a relevant object based on a determination that a location associated with the object is within a threshold distance of a drivable area and/or a path of the vehicle.

In additional or alternative examples, the perception component 522 may provide processed sensor data that indicates one or more characteristics associated with a detected entity (e.g., a tracked object, relevant object, etc.) and/or the environment in which the object is positioned. In some examples, characteristics associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Characteristics associated with the environment may include, but are not limited to, a presence of another object in the environment, a state of another object in the environment, a time of day, a day of a week, a season, a weather condition, an indication of darkness/light, etc.

In general, the planning component 524 may determine a path for the vehicle 502 to follow to traverse through an environment. For example, the planning component 524 may determine various routes and vehicle trajectories and various levels of detail. For example, the planning component 524 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 524 may generate an instruction for guiding the autonomous vehicle 502 along at least a portion of the route from the first location to the second location. In at least one example, the planning component 524 may determine how to guide the autonomous vehicle from a first waypoint in the sequence of waypoints to a second waypoint in the sequence of waypoints. In some examples, the instruction may be a vehicle trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 502 to navigate.

In various examples, the route may be based at least in part on a determination an object is or will be within a threshold distance of the path of the vehicle 502. The action may include adjusting a position in a lane to circumnavigate the object, and/or at least partially exiting a lane to circumnavigate the object (e.g., change lanes, operate in a bicycle lane, on a shoulder, etc.), stopping and/or maintaining a stopped position prior to a location associated with the object, slowing to a speed associated with the object and maintaining a distance behind the object, or the like.

In various examples, the planning component 524 may determine the action for the vehicle 502 to take based on the determination the object is or will be within the threshold distance of the path of the vehicle 502.

In such examples, the prediction component 526 may be configured to determine the predicted object trajectories. In some examples, a prediction component 526 may measure a trace of an object and generate a trajectory for the object based on observed and predicted behavior. In various examples, the predicted object trajectories may be determined based on detected movement of the object over time. In such examples, the prediction component 526 may observe locations of the object over time to determine the predicted object trajectories and determine the object will likely be within a threshold distance of the vehicle path when the vehicle passes the object.

In some examples, the predicted object trajectories may be based on a top-down representation of an environment, such as by utilizing the techniques described in U.S. patent application Ser. No. 16/151,607 and in U.S. patent application Ser. No. 16/504,147, both of which are incorporated herein by reference for all purposes. In some examples, the predicted object trajectories may be determined using probabilistic heat maps (e.g., discretized probability distribution), tree search methods, temporal logic formulae, and/or machine learning techniques to predict object behavior, such as that described in the U.S. Patent Applications incorporated herein by reference above. In various examples, the confidence may represent a level of certainty that the prediction component 526 may have in the accuracy of the predicted object trajectory.

In various examples, the planning component 524 may determine an action to take based at least in part on a cost associated therewith. In such examples, an action cost component 528 may be configured to determine a cost associated with each viable action. A viable action may include an action the vehicle may perform within predetermined constraints, such as the perceived safety subgoal constraints, not traveling closer than a minimum safe distance from an object, not breaking an operating law, etc. The costs may include one or more of a perceived safety cost, a safety cost, a comfort cost, a progress cost, and/or an operational rules cost, as described above. In various examples, the planning component 524 may select a lowest cost action as the action to perform.

In at least one example, the vehicle computing device(s) 504 may include one or more system controllers 530, which may be configured to control steering, propulsion, braking, safety, emitters, communication, and other systems of the vehicle 502. The system controller(s) 530 may communicate with and/or control corresponding systems of the drive system(s) 514 and/or other components of the vehicle 502.

The memory 518 may further include one or more maps 532 that may be used by the vehicle 502 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 502 may be controlled based at least in part on the map(s) 532. That is, the map(s) 532 may be used in connection with the localization component 520, the perception component 522, and/or the planning component 524 to determine a location of the vehicle 502, detect objects in an environment, generate routes, determine actions and/or trajectories to navigate within an environment.

In some examples, the one or more maps 532 may be stored on a remote computing device(s) (such as in a map component 538 of the computing device(s) 536) accessible via one or more networks 540. In some examples, multiple maps 532 may be stored based on, for example, a characteristic (e.g., type of entity, time of day, day of week, season of the year, etc.). Storing multiple maps 532 may have similar memory requirements, but increase the speed at which data in a map may be accessed.

As can be understood, the components discussed herein (e.g., the localization component 520, the perception component 522, the planning component 524 including the prediction component 526 and the action cost component 528, the one or more system controllers 530, the one or more maps 532 are described as divided for illustrative purposes. However, the operations performed by the various components may be combined or performed in any other component.

In some instances, aspects of some or all of the components discussed herein may include any models, techniques, and/or machine learning techniques. For example, in some instances, the components in the memory 518 (and the memory 534, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet301, VGG, DenseNet, PointNet, and the like.

In at least one example, the sensor system(s) 506 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 506 may include multiple instances of each of these or other types of sensors. For instance, the lidar sensors may include individual lidar sensors located at the corners, front, back, sides, and/or top of the vehicle 502. As another example, the camera sensors may include multiple cameras disposed at various locations about the exterior and/or interior of the vehicle 502. The sensor system(s) 506 may provide input to the vehicle computing device(s) 504. Additionally or in the alternative, the sensor system(s) 506 may send sensor data, via the one or more networks 540, to the one or more computing device(s) 536 at a particular frequency, after a lapse of a predetermined period of time, in near real-time, etc.

The vehicle 502 may also include one or more emitters 508 for emitting light and/or sound. The emitters 508 may include interior audio and visual emitters to communicate with passengers of the vehicle 502. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 508 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

In various examples, the planning component 524 may be configured to cause one or more signals to be emitted via the emitter(s) 508 toward a detected object. In some examples, the planning component 524 may cause the signal(s) to be emitted prior to taking an action, such as that determined above based on the likelihood that the object will remain in the path of the vehicle. As discussed above, the signal(s) may include an audio and/or visual signal. In some examples, the signal(s) may signal an intent to alert the object of the vehicle 104 in the environment. In some examples, the signal(s) may provide information to the object, such as a direction the object may travel to move out of the path of the vehicle.

In various examples, responsive to emitting the signal(s), the perception component 522 may receive sensor data corresponding to a response and/or an indication of intent of the object to change a location or not. In some examples, the indication may be received via a microphone, speaker, or other sensor system(s) 506. In at least one example, the indication may be received via an audio input via a microphone. In such an example, the perception component 522 may be configured to process the audio input to determine an intent and/or indication associated therewith, such as via natural language processing, or the like. In some examples, the indication may be received via a camera sensor, such as in an image. In such examples, the perception component 522 may be configured to determine the intent and/or indication by processing the image data. For example, the perception component 522 may indicate that the object remains in a position and/or location and waves at the vehicle 502 responsive to the emitted signal(s). The perception component 522 may determine that the indication includes an intent to remain at a location blocking the path of the vehicle 502.

The vehicle 502 may also include one or more communication connections 510 that enable communication between the vehicle 502 and one or more other local or remote computing device(s). For instance, the communication connection(s) 510 may facilitate communication with other local computing device(s) on the vehicle 502 and/or the drive system(s) 514. Also, the communication connection(s) 510 may allow the vehicle to communicate with other nearby computing device(s) (e.g., computing device(s) 536, other nearby vehicles, etc.) and/or one or more remote sensor system(s) 542 for receiving sensor data.

The communications connection(s) 510 may include physical and/or logical interfaces for connecting the vehicle computing device(s) 504 to another computing device or a network, such as network(s) 540. For example, the communications connection(s) 510 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 may include one or more drive systems 514. In some examples, the vehicle 502 may have a single drive system 514. In at least one example, if the vehicle 502 has multiple drive systems 514, individual drive systems 514 may be positioned on opposite ends of the vehicle 502 (e.g., the front and the rear, etc.). In at least one example, the drive system(s) 514 may include one or more sensor systems to detect conditions of the drive system(s) 514 and/or the surroundings of the vehicle 502. By way of example and not limitation, the sensor system(s) may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 514. In some cases, the sensor system(s) on the drive system(s) 514 may overlap or supplement corresponding systems of the vehicle 502 (e.g., sensor system(s) 506).

The drive system(s) 514 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 may include a drive module controller which may receive and preprocess data from the sensor system(s) and to control operation of the various vehicle systems. In some examples, the drive module controller may include one or more processors and memory communicatively coupled with the one or more processors. The memory may store one or more systems to perform various functionalities of the drive system(s) 514. Furthermore, the drive system(s) 514 may also include one or more communication connection(s) that enable communication by the respective drive module with one or more other local or remote computing device(s).

In at least one example, the direct connection 512 may provide a physical interface to couple the one or more drive system(s) 514 with the body of the vehicle 502. For example, the direct connection 512 may allow the transfer of energy, fluids, air, data, etc. between the drive system(s) 514 and the vehicle. In some instances, the direct connection 512 may further releasably secure the drive system(s) 514 to the body of the vehicle 502.

In at least one example, the localization component 520, the perception component 522, the planning component 524, the one or more system controllers 530, the one or more maps 532, the prediction component 526, and the action cost component 528, may process data (e.g., sensor data), as described above, and may send their respective outputs, over the one or more network(s) 540, to the computing device(s) 536. In at least one example, the localization component 520, the perception component 522, the planning component 524, the one or more system controllers 530, the one or more maps 532, the prediction component 526, and the action cost component 528 may send their respective outputs to the computing device(s) 536 at a particular frequency, after a lapse of a predetermined period of time, in near real-time, etc.

In some examples, the vehicle 502 may send sensor data to the computing device(s) 536 via the network(s) 540. In some examples, the vehicle 502 may receive sensor data from the computing device(s) 536 and/or remote sensor system(s) 542 via the network(s) 540. The sensor data may include raw sensor data and/or processed sensor data and/or representations of sensor data. In some examples, the sensor data (raw or processed) may be sent and/or received as one or more log files.

The computing device(s) 536 may include one or more processors 544 and a memory 534 storing the map component 538 and a sensor data processing component 546. In various examples, the sensor data processing component 546 may be configured to receive data from one or more remote sensors, such as sensor system(s) 506 and/or remote sensor system(s) 542. In some examples, the sensor data processing component 546 may be configured to process the data and send the processed data to the planning component 524 for determining an action for the vehicle 502 to take. In some examples, the sensor data processing component 546 may be configured to process the data and send processed sensor data to the vehicle computing device(s) 504, such as for use by the action cost component 528, and/or the prediction component 526. In some examples, the sensor data processing component 546 may be configured to send raw sensor data to the vehicle computing device(s) 504.

The processor(s) 516 of the vehicle 502 and the processor(s) 544 of the computing device(s) 536 may be any suitable processor capable of executing instructions to process data and perform operations as described herein. By way of example and not limitation, the processor(s) 516 and 544 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 518 and 534 are examples of non-transitory computer-readable media. The memory 518 and 534 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 518 and 534 may include at least a working memory and a storage memory. For example, the working memory may be a high-speed memory of limited capacity (e.g., cache memory) that is used for storing data to be operated on by the processor(s) 516 and 544. In some instances, the memory 518 and 534 may include a storage memory that may be a lower-speed memory of relatively large capacity that is used for long-term storage of data. In some cases, the processor(s) 516 and 544 cannot operate directly on data that is stored in the storage memory, and data may need to be loaded into a working memory for performing operations based on the data, as discussed herein.

It should be noted that while FIG. 5 is illustrated as a distributed system, in alternative examples, components of the vehicle 502 may be associated with the computing device(s) 536 and/or components of the computing device(s) 536 may be associated with the vehicle 502. That is, the vehicle 502 may perform one or more of the functions associated with the computing device(s) 536, and vice versa.

EXAMPLE CLAUSES

A: A vehicle system comprising: a sensor; one or more processors; and memory storing processor-executable instructions that, when executed by the one or more processors, configure the vehicle system to: receive sensor data of an environment from the sensor; identify a pedestrian at a location in the environment based at least in part on the sensor data; determine a predicted trajectory associated with the pedestrian; determine, based on the predicted trajectory, that the pedestrian will be within a threshold distance of the vehicle as the vehicle operates according to a first vehicle trajectory associated with the vehicle; determine a second vehicle trajectory based at least in part on the predicted trajectory of the pedestrian, wherein the second vehicle trajectory is associated with the vehicle navigating to avoid the pedestrian, wherein the vehicle is configured to determine the second vehicle trajectory by: determining, based on a perceived safe distance metric, a lateral distance associated with navigating to avoid the pedestrian; or determining, based on a perceive safe speed metric, a vehicle speed associated with navigating to avoid the pedestrian based at least in part on the lateral distance; and determining the second vehicle trajectory based at least in part on the lateral distance and the vehicle speed; and controlling the vehicle based on the second vehicle trajectory.

B. The vehicle system as clause A recites, wherein determining the vehicle speed is based at least in part on a perceived safe speed cost and the perceived safe speed cost based on a perceived safe speed, the perceived safe speed being determined based on the lateral distance by determining the perceived safe speed as a result of a mathematical function using the lateral distance, the mathematical function being determined based on previous lateral distances and associated speeds in passing interactions of vehicles and objects.

C. The vehicle system as clause A recites, wherein the instructions further configure the vehicle to determine the second vehicle trajectory by: determining, based on the predicted trajectory, a distance to the pedestrian; and wherein determining the second vehicle trajectory comprises determining a cost optimization function based at least in part on a weighting of a perceived safe speed cost, the weighting based at least in part on the distance to the pedestrian, the weighting increasing as the distance remaining to the pedestrian decreases.

D. The vehicle system as clause A recites, wherein the determining the vehicle speed is based at least in part on a perceived safe speed cost and the determining the second vehicle trajectory comprises a cost optimization function including a weighting of the perceived safe speed cost, the weighting based at least in part on the lateral distance, the weighting increasing as the lateral distance decreases.

E. The vehicle system as clause A recites, wherein the determining the vehicle speed is based at least in part on a perceived safe speed cost and the perceived safe speed cost is based on a difference between the vehicle speed and a perceived safe speed associated with the lateral distance.

F. A method comprising: receiving sensor data of an environment from a sensor associated with a vehicle; determining, based at least in part on the sensor data, an object in the environment; receiving a predicted object trajectory associated with the object; determining, based on the predicted object trajectory, a predicted object location; determining, based on the predicted object location and the predicted object trajectory, a distance between a predicted vehicle passing location and the predicted object location or a speed of the vehicle in proximity to the predicted object location; determining, based a perceived safety metric, and the distance or the speed, a trajectory for the vehicle to follow; and controlling the vehicle based on the trajectory.

G. The method as clause F recites, wherein determining the speed comprises: determining a perceived safe speed based on the distance comprising: retrieving the perceived safe speed from a look-up table of a plurality of perceived safe speeds indexed based on distance; or determining the perceived safe speed based on a result of a mathematical function based on the distance.

H. The method of clause G, wherein determining the trajectory for the vehicle to follow comprises excluding one or more possible trajectories that do not include the vehicle traveling at one of the plurality of perceived safe speeds associated with a plurality of corresponding distances between corresponding simulated vehicle passing locations and predicted object locations.

I. The method of clause G, wherein the distance is a lateral distance associated with navigating around the object; and the speed is a vehicle speed associated with navigating around the object based at least in part on a perceived safe speed cost determined based at least in part on the lateral distance.

J. The method of clause I, wherein the perceived safe speed cost is based on the perceived safe speed, the perceived safe speed being determined based on the lateral distance by determining the perceived safe speed as the result of the mathematical function based on the lateral distance, the mathematical function being determined based on previous lateral distances and associated speeds of passing interactions of vehicles and objects.

K. The method of clause F, wherein determining the trajectory further comprises: determining a different speed based on the distance; determining a second cost based on the distance and the different speed is less than a first cost based on the distance and the speed; and determining, based on the determining the second cost is less than the first cost, the trajectory based on the distance and the different speed.

L. The method of clause F, wherein determining the speed further comprises: determining a classification of the predicted object location; and determining the speed based at least in part on the distance and the classification of the predicted object location.

M. The method of clause F, wherein the object is a pedestrian and determining the distance comprises: determining one of an arm length or a height of the pedestrian; and determining the speed is based at least in part on the arm length or the height of the pedestrian.

N. One or more non-transitory computer-readable media storing instructions that, when executed, cause one or more processors to perform operations comprising: receiving sensor data of an environment from a sensor associated with a vehicle; determining, based at least in part on the sensor data, an object in the environment; receiving a predicted object trajectory associated with the object; determining, based on the predicted object trajectory, a predicted object location; determining, based on the predicted object location and the predicted object trajectory, a distance between a predicted vehicle passing location and the predicted object location or a speed of the vehicle in proximity to the predicted object location; determining, based a perceived safety metric, and the distance or the speed, a trajectory for the vehicle to follow; and controlling the vehicle based on the trajectory.

O. The one or more non-transitory computer-readable media of clause N, wherein determining the speed comprises: determining a perceived safe speed based on the distance comprising:
retrieving the perceived safe speed from a look-up table of a plurality of perceived safe speeds indexed based on distance; or determining the perceived safe speed based on a result of a mathematical function based on the distance.

P. The one or more non-transitory computer-readable media of clause N, wherein determining the trajectory for the vehicle to follow comprises excluding one or more possible trajectories that do not include the vehicle traveling at one of a plurality of perceived safe speeds associated with a plurality of corresponding distances between corresponding simulated vehicle passing locations and predicted object locations.

Q. The one or more non-transitory computer-readable media of clause N, wherein: the distance is a lateral distance associated with navigating around the object; and the speed is a vehicle speed associated with navigating around the object based at least in part on a perceived safe speed cost determined based at least in part on the lateral distance.

R. The one or more non-transitory computer-readable media of clause Q, wherein the perceived safe speed cost is based on the perceived safe speed, the perceived safe speed being determined based on the lateral distance by determining the perceived safe speed as the result of the mathematical function based on the lateral distance, the mathematical function being determined based on previous lateral distances and associated speeds of passing interactions of vehicles and objects.

S. The one or more non-transitory computer-readable media of clause R, wherein the operations further comprise: determining a distance to the object; and wherein determining the trajectory comprises determining a cost optimization function based at least in part on a weighting of the perceived safe speed cost, the weighting based at least in part on the distance to the object, the weighting increasing as the distance remaining to the object decreases.

T. The one or more non-transitory computer-readable media of clause R, wherein determining the trajectory comprises determining a cost optimization function based at least in part on a weighting of the perceived safe speed cost, the weighting based at least in part on the lateral distance, the weighting increasing as the lateral distance decreases.

While the example clauses described above are described with respect to one particular implementation, it should be understood that, in the context of this document, the content of the example clauses may also be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A vehicle system comprising:
a sensor;
one or more processors; and
memory storing processor-executable instructions that, when executed by the one or more processors, configure the vehicle system to:
receive sensor data of an environment from the sensor;
identify a pedestrian at a location in the environment based at least in part on the sensor data;
determine a predicted trajectory associated with the pedestrian;
determine, based on the predicted trajectory, that the pedestrian will be within a threshold distance of the vehicle as the vehicle operates according to a first vehicle trajectory associated with the vehicle;
determine a second vehicle trajectory based at least in part on the predicted trajectory of the pedestrian, wherein the second vehicle trajectory is associated with the vehicle navigating to avoid the pedestrian, wherein the vehicle is configured to determine the second vehicle trajectory by:
determining a physical characteristic of a pedestrian;
determining, based on a perceived safe distance metric and the physical characteristic, a lateral distance associated with navigating to avoid the pedestrian; and
determining, based on a perceived safe speed metric and the physical characteristic, a vehicle speed associated with navigating to avoid the pedestrian based at least in part on the lateral distance;
determining the second vehicle trajectory based at least in part on the lateral distance and the vehicle speed; and
controlling the vehicle based on the second vehicle trajectory.

2. The vehicle system as claim 1 recites, wherein determining the vehicle speed is based at least in part on a perceived safe speed cost and the perceived safe speed cost based on a perceived safe speed, the perceived safe speed being determined based on the lateral distance by determining the perceived safe speed as a result of a mathematical function using the lateral distance, the mathematical function being determined based on previous lateral distances and associated speeds in passing interactions of vehicles and objects.

3. The vehicle system as claim 1 recites, wherein the instructions further configure the vehicle to determine the second vehicle trajectory by:
determining, based on the predicted trajectory, a distance to the pedestrian; and
wherein determining the second vehicle trajectory comprises determining a cost optimization function based at least in part on a weighting of a perceived safe speed cost, the weighting based at least in part on the distance to the pedestrian, the weighting increasing as the distance remaining to the pedestrian decreases.

4. The vehicle system as claim 1 recites, wherein the determining the vehicle speed is based at least in part on a perceived safe speed cost and the determining the second vehicle trajectory comprises a cost optimization function including a weighting of the perceived safe speed cost, the weighting based at least in part on the lateral distance, the weighting increasing as the lateral distance decreases.

5. The vehicle system as claim 1 recites, wherein the determining the vehicle speed is based at least in part on a perceived safe speed cost and the perceived safe speed cost is based on a difference between the vehicle speed and a perceived safe speed associated with the lateral distance.

6. A method comprising:
receiving sensor data of an environment from a sensor associated with a vehicle;
determining, based at least in part on the sensor data, an object in the environment;
receiving a predicted object trajectory associated with the object;
determining, based on the predicted object trajectory, a predicted object location;
determining a physical characteristic of the object, wherein the object is a pedestrian;
determining, based on the predicted object location, the predicted object trajectory, and the physical characteristic, a distance between a predicted vehicle passing location and the predicted object location or a speed of the vehicle in proximity to the predicted object location;
determining, based a perceived safety metric, and the distance or the speed, a trajectory for the vehicle to follow; and
controlling the vehicle based on the trajectory.

7. The method as claim 6 recites, wherein determining the speed comprises:
determining a perceived safe speed based on the distance comprising:
retrieving the perceived safe speed from a look-up table of a plurality of perceived safe speeds indexed based on distance; or
determining the perceived safe speed based on a result of a mathematical function based on the distance.

8. The method of claim 7, wherein determining the trajectory for the vehicle to follow comprises excluding one or more possible trajectories that do not include the vehicle traveling at one of the plurality of perceived safe speeds associated with a plurality of corresponding distances between corresponding simulated vehicle passing locations and predicted object locations.

9. The method of claim 7, wherein the distance is a lateral distance associated with navigating around the object; and
the speed is a vehicle speed associated with navigating around the object based at least in part on a perceived safe speed cost determined based at least in part on the lateral distance.

10. The method of claim 9, wherein the perceived safe speed cost is based on the perceived safe speed, the perceived safe speed being determined based on the lateral distance by determining the perceived safe speed as the result of the mathematical function based on the lateral distance, the mathematical function being determined based on previous lateral distances and associated speeds of passing interactions of vehicles and objects.

11. The method of claim 6, wherein determining the trajectory further comprises:
determining a different speed based on the distance;
determining a second cost based on the distance and the different speed is less than a first cost based on the distance and the speed; and
determining, based on the determining the second cost is less than the first cost, the trajectory based on the distance and the different speed.

12. The method of claim 6, wherein determining the speed further comprises:
determining a classification of the predicted object location; and
determining the speed based at least in part on the distance and the classification of the predicted object location.

13. The method of claim 6, wherein the physical characteristic of the pedestrian comprises
one of an arm length or a height of the pedestrian.

14. One or more non-transitory computer-readable media storing instructions that, when executed, cause one or more processors to perform operations comprising:
receiving sensor data of an environment from a sensor associated with a vehicle;
determining, based at least in part on the sensor data, an object in the environment;
receiving a predicted object trajectory associated with the object;
determining, based on the predicted object trajectory, a predicted object location;
determining a physical characteristic of the predicted object, wherein the predicted object is a pedestrian;
determining, based on the predicted object location, the predicted object trajectory, and the physical characteristic, a distance between a predicted vehicle passing location and the predicted object location or a speed of the vehicle in proximity to the predicted object location;
determining, based a perceived safety metric, and the distance or the speed, a trajectory for the vehicle to follow; and
controlling the vehicle based on the trajectory.

15. The one or more non-transitory computer-readable media of claim 14, wherein determining the speed comprises:
determining a perceived safe speed based on the distance comprising:
retrieving the perceived safe speed from a look-up table of a plurality of perceived safe speeds indexed based on distance; or
determining the perceived safe speed based on a result of a mathematical function based on the distance.

16. The one or more non-transitory computer-readable media of claim 15, wherein determining the trajectory for the vehicle to follow comprises excluding one or more possible trajectories that do not include the vehicle traveling at one of a plurality of perceived safe speeds associated with a plurality of corresponding distances between corresponding simulated vehicle passing locations and predicted object locations.

17. The one or more non-transitory computer-readable media of claim 15, wherein:
the distance is a lateral distance associated with navigating around the object; and
the speed is a vehicle speed associated with navigating around the object based at least in part on a perceived safe speed cost determined based at least in part on the lateral distance.

18. The one or more non-transitory computer-readable media of claim 17, wherein the perceived safe speed cost is based on the perceived safe speed, the perceived safe speed being determined based on the lateral distance by determining the perceived safe speed as the result of the mathematical function based on the lateral distance, the mathematical function being determined based on previous lateral distances and associated speeds of passing interactions of vehicles and objects.

19. The one or more non-transitory computer-readable media of claim 18, wherein the operations further comprise:
   determining a distance to the object; and
   wherein determining the trajectory comprises determining a cost optimization function based at least in part on a weighting of the perceived safe speed cost, the weighting based at least in part on the distance to the object, the weighting increasing as the distance remaining to the object decreases.

20. The one or more non-transitory computer-readable media of claim 18, wherein determining the trajectory comprises determining a cost optimization function based at least in part on a weighting of the perceived safe speed cost, the weighting based at least in part on the lateral distance, the weighting increasing as the lateral distance decreases.

* * * * *